United States Patent
White (10) Patent No.: US 8,646,022 B2
(45) Date of Patent: Feb. 4, 2014

(54) METHODS AND APPARATUS TO CONFIGURE BROADBAND-ENABLED ENTERTAINMENT SYSTEMS

(75) Inventor: Scott White, Austin, TX (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 805 days.

(21) Appl. No.: 12/110,453

(22) Filed: Apr. 28, 2008

(65) Prior Publication Data

US 2009/0271830 A1 Oct. 29, 2009

(51) Int. Cl.
- *H04N 7/16* (2011.01)
- *H04N 7/20* (2006.01)
- *H04N 7/173* (2011.01)
- *H04L 9/32* (2006.01)
- *G06F 21/00* (2013.01)

(52) U.S. Cl.
USPC ............... 725/139; 725/30; 725/71; 725/109; 713/182; 713/168

(58) Field of Classification Search
None
See application file for complete search history.

(56) References Cited

U.S. PATENT DOCUMENTS

| | | | |
|---|---|---|---|
| 6,751,441 B1 | 6/2004 | Murray et al. | |
| 2005/0125083 A1 | 6/2005 | Kiko | |
| 2006/0036847 A1* | 2/2006 | Bush et al. | 713/153 |
| 2006/0123457 A1 | 6/2006 | Chen et al. | |
| 2006/0150244 A1* | 7/2006 | Klein et al. | 726/12 |
| 2006/0262717 A1 | 11/2006 | Wiatt et al. | |
| 2007/0124416 A1 | 5/2007 | Casey et al. | |
| 2007/0209052 A1 | 9/2007 | Taylor et al. | |
| 2008/0148350 A1* | 6/2008 | Hawkins et al. | 726/2 |
| 2009/0199276 A1* | 8/2009 | Schneider | 726/5 |
| 2009/0216861 A1* | 8/2009 | Shiely et al. | 709/219 |
| 2010/0016683 A1* | 1/2010 | Lemmers et al. | 600/301 |
| 2011/0093892 A1* | 4/2011 | Arnold et al. | 725/38 |

OTHER PUBLICATIONS

Document outlining TV-based configuration flow for Homezone product, 33 pages, Nov. 1, 2006.

* cited by examiner

*Primary Examiner* — Ricky Chin
(74) *Attorney, Agent, or Firm* — Hanley, Flight & Zimmerman, LLC.

(57) ABSTRACT

Methods and apparatus to configure broadband-enabled entertainment systems are disclosed. An example method comprises presenting a first user interface to enable a user to configure a communication service between a residential gateway and a service provider, detecting a set-top box communicatively coupled to the residential gateway, directing the set-top box to present a second user interface, the second user interface to accept a security key to enable communication between the residential gateway and the set-top box, and presenting a third user interface to provide the security key to the user and to instruct the user to utilize the second user interface to provide the security key to the set-top box.

22 Claims, 7 Drawing Sheets

METHODS AND APPARATUS TO CONFIGURE BROADBAND-ENABLED ENTERTAINMENT SYSTEMS

FIELD OF THE DISCLOSURE

This disclosure relates generally to broadband-enabled entertainment systems and, more particularly, to methods and apparatus to configure broadband-enabled entertainment systems.

BACKGROUND

Some broadband-enabled entertainment systems include a set-top box, one or more personal computers and a residential gateway communicatively coupled via a local area network. The residential gateway communicatively couples the local area network to an Internet protocol based network, such as the Internet. The local area network may be either wired and/or wireless. The set-top box may be further communicatively coupled to a content delivery medium such as a satellite content delivery signal and/or a cable television delivery signal. In such systems, the set-top box is configurable to receive content via the content delivery medium and the residential gateway, and the set-top box and the personal computers are configurable to share content via the local area network. Such content may be presented at either a display (e.g., a television) coupled to the set-top box and/or at the personal computer(s).

DETAILED DESCRIPTION

Methods and apparatus to configure broadband-enabled entertainment systems are disclosed. A disclosed example method includes presenting a first user interface to enable a user to configure a communication service between a residential gateway and a service provider, detecting a set-top box communicatively coupled to the residential gateway, directing the set-top box to present a second user interface, the second user interface to accept a security key to enable communication between the residential gateway and the set-top box, and presenting a third user interface to provide the security key to the user and to instruct the user to utilize the second user interface to provide the security key to the set-top box.

A disclosed example apparatus includes a gateway configurer to configure a communication service between a residential gateway and an Internet service provider, a set-top box detector to detect a set-top box communicatively coupled to the residential gateway, and to direct the set-top box to present a first user interface to accept a security key to enable communication between the residential gateway and the set-top box, and an interface provider to present a second user interface to provide the security key to the user and to instruct the user how to provide the security key to the set-top box.

A disclosed example set-top box includes a query responder to respond to a query from a computer, the query used by the computer to determine whether the set-top box is communicatively coupled to the computer, and an interface presenter to present a first user interface at the set-top box when queried by the computer, the first user interface to receive a security key to enable communication between the set-top box and a residential gateway.

Another disclosed example method includes responding to a query to verify a communicative coupling of a set-top box to a residential gateway, in response to the query, presenting a user interface at the set-top box to enable a user to input a security key, and attempting to communicatively couple the set-top box to the residential gateway using the security key.

A disclosed example communication system includes a set-top box to receive media via a first communication path; a residential gateway to communicatively couple the set-top box to an Internet protocol based network; and a personal computer to present a first interface to enable a user to configure the residential gateway, detect that the set-top box is communicatively coupled to the residential gateway, direct the set-top box to present a second user interface to accept a security key to enable communication between the residential gateway and the set-top box, and present a third user interface to provide the security key to the user and to instruct the user how to utilize the second user interface to provide the security key to the set-top box.

In the interest of brevity and clarity, throughout the following disclosure references will be made to a broadband-enabled entertainment system including a residential gateway containing a digital subscriber line (DSL) modem and a network interface (e.g., a wireless Ethernet transceiver), and a set-top box containing a satellite receiver and a network interface (e.g., a wireless Ethernet transceiver). However, the methods and apparatus to configure a broadband-enabled entertainment system described herein may, additionally or alternatively, be used to configure other types of broadband-enabled entertainment systems, for example, those associated with coaxial cable distribution systems, cable television distribution systems, cable modems (e.g., based on International Telecommunications Union-Telecommunications Sector (ITU-T) Recommendations J.112, J.122 and/or J.222), wired Ethernet routers, wired Ethernet transceiver, public switched telephone network (PSTN) systems, public land mobile network (PLMN) systems (e.g., cellular), wireless distribution systems (e.g., based on Institute of Electrical and Electronics Engineers (IEEE) 802.16, a.k.a. WiMAX), wired or cable distribution systems, Ultra High Frequency (UHF)/Very High Frequency (VHF) radio frequency systems, other extra-terrestrial systems, cellular distribution systems, power-line broadcast systems, fiber optic networks, passive optical network (PON) systems, and/or any combination and/or hybrid of these devices, systems and/or networks.

Figure 1:
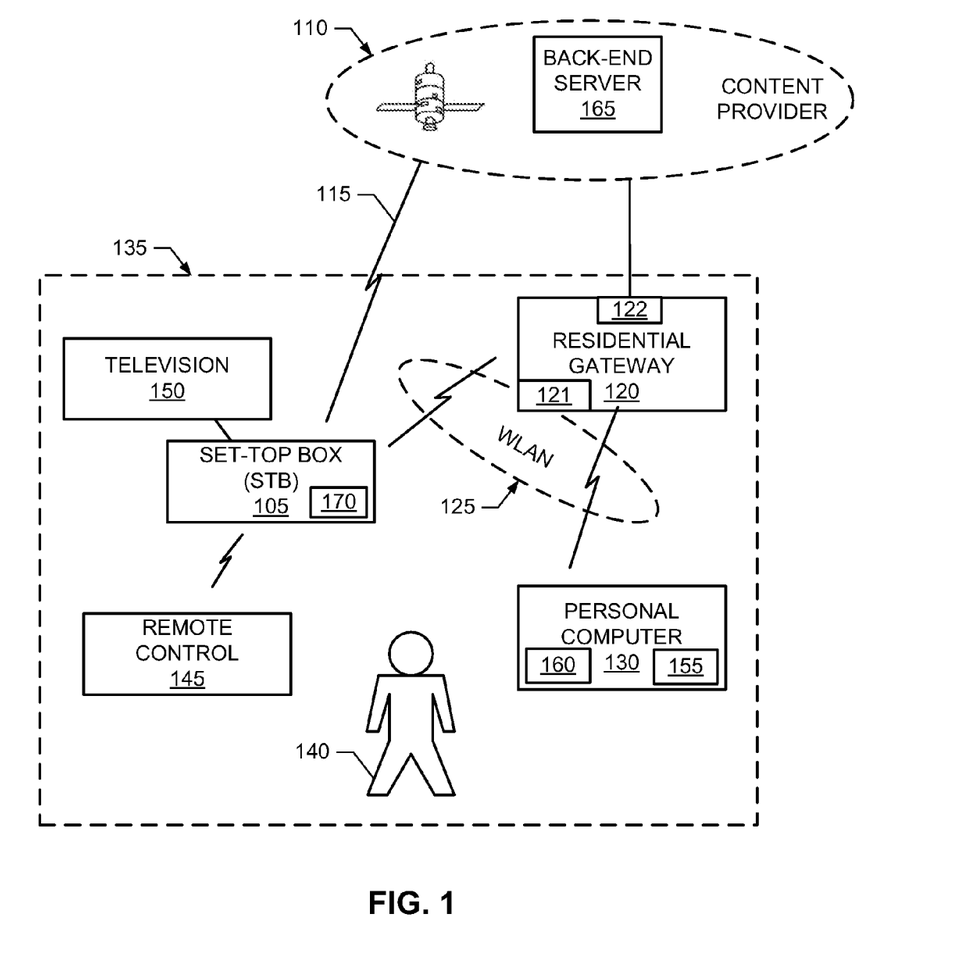
FIG. 1 is a schematic illustration of an example broadband-enabled communication system constructed in accordance with the teachings of the disclosure.

FIG. 1 illustrates an example broadband-enabled entertainment system including a set-top box 105 configurable to receive media content (e.g., pictures, movies, video, television shows, music, files, etc.) via one or more content providers, one of which is designated at reference numeral 110. The example set-top box 105 of FIG. 1 may, additionally or alternatively, be configured to receive content via a residential gateway 120. The example set-top box 105 is communicatively coupled to the residential gateway 120 via any number and/or type(s) of local area networks (e.g., a wireless local area network (WLAN)), one of which is designated at reference numeral 125.

To communicatively couple the example residential gateway 120 of FIG. 1 to the WLAN 125, the residential gateway 120 includes any type(s) and/or number of network interfaces (e.g., WLAN transceivers), one of which is designated at reference numeral 121. To communicatively couple devices of the WLAN 125 (e.g., the example set-top box 105 and a personal computer 130) to a private and/or public Internet protocol (IP) based network, such as the Internet, and/or to the example content provider 110, the example residential gateway 120 of FIG. 1 includes any number and/or type(s) of modems, one of which is designated at reference numeral 122. The example modem 122 may be, for example, a DSL modem.

The example set-top box 105, the example residential gateway 120 and the example personal computer 130 of FIG. 1 are implemented at, by and/or within a residential and/or business location 135. A user 140 at the example location 135 is able to receive, purchase, present, consume and/or share media content at and/or via the personal computer 130 and/or the set-top box 105. For example, the user 140 may use a remote control 145 to interact with the example set-top box 105 to select a program received via the satellite signal 115 and then view the selected program at the set-top box 105 via a display (e.g., a television 50) communicatively coupled to the set-top box 105. Additionally or alternatively, the user 140 may select content received by the set-top box 105 via the residential gateway 120 for viewing at the television 150. Moreover, the user 140 may configure the sharing of content between the set-top box 105 (e.g., the television 150) and the personal computer 130 to enable the consumption of media content at either the set-top box 105 and/or the personal computer 130 regardless of whether the content is received at and/or by the set-top box 105 or the personal computer 130, and regardless of whether the media is received via the satellite signal 115 and/or via the residential gateway 120.

Traditionally, the installation and configuration of a set-top box, a residential gateway and a personal computer are done separately, by different persons, and often on different days. For example, the set-top box may be installed by a service technician on a different day than the day when a user performed a self-install of their residential gateway. In many instances, the installation of the set-top box precedes the installation of the residential gateway. However, to enable communication between the set-top box and the residential gateway, the set-top box must be appropriately configured. Existing methods rely on the user to navigate through a myriad of complicated (to some average users) menus in order to properly configure the set-top box. Moreover, interactions between the user and the set-top box occur via a remote control making such a manual configuration of the set-top box even more difficult. In some instances, the user may be unaware that they need to configure set-top box to residential gateway communication, and/or may be unaware that they can share content between the set-top box and the personal computer. As such, in many instances the set-top box remains incompletely and/or incorrectly configured, and leaves the set-top box unable to obtain content via the residential gateway and/or unable to share media with the personal computer. Such circumstances often lead to subscriber dissatisfaction, subscriber churn, and/or to lost content provider revenue. In contrast, the methods and apparatus described herein are automated, substantially less error prone, and require far less involvement by the user 140 to properly setup the set-top box 105, and to setup content sharing between the set-top box 105 and the personal computer 130.

During installation of the residential gateway 120, the example user 140 of FIG. 1 utilizes an installer 155. The example installer 155 of FIG. 1 presents one or more graphical user interfaces that allow the user 140 to configure the residential gateway 120 and to configure communication between the personal computer 130 and the residential gateway 120. The example user 140 of FIG. 1 uses the installer 155 to configure the DSL modem 122 (e.g., with the subscriber's username and password) to enable the residential gateway 120 to become communicatively coupled to the Internet, and to configure a WLAN transceiver 160 to connect the personal computer 130 to the WLAN 125. The installer 155 also uses the provided username and password to authenticate the personal computer 130 to be able to receive content via the residential gateway 120. Because the personal computer 130 can present more information (e.g., via more detailed and more easily understood graphical user interface screens) and/or implements more human friendly methods of interaction (e.g., a keyboard and/or a computer mouse) than a set-top box, the user 140 can more easily interact with the personal computer 130 than the set-top box 105. The example installer 155 of FIG. 1 is implemented by machine accessible instructions executing on a processor of the personal computer 130.

Figures 2A, 2B:
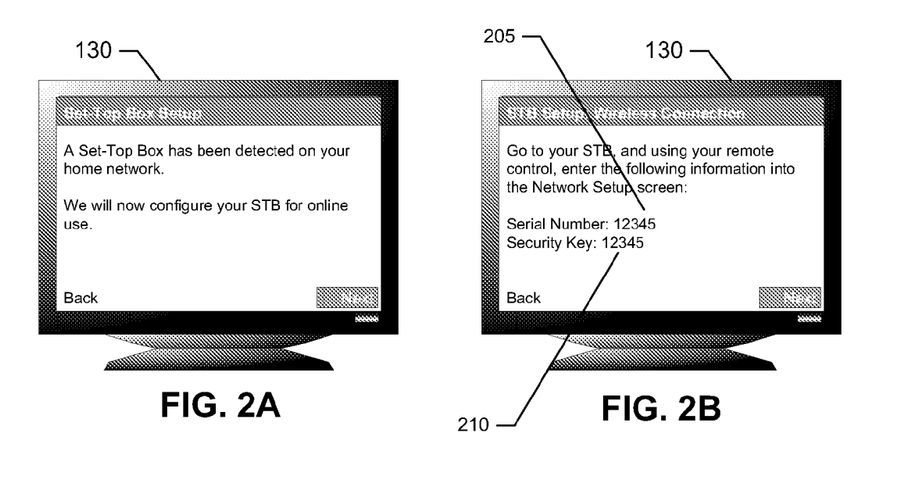
FIGS. 2A-F illustrate example user interfaces that may be used to implement the example personal computer of FIG. 1.

When the example installer 155 of FIG. 1 completes the configuration of the residential gateway 120 and the WLAN transceiver 160, the installer 155 automatically attempts to detect whether a set-top box (e.g., the set-top box 105) is present at the location 135. If the example installer 155 detects the set-top box 105, the installer 155 automatically directs the set-top box 105 to display a simple user interface (e.g., the example user interface of FIG. 3A) at the set-top box 105 (e.g., on the television 150). The installer 155 then presents a user interface (e.g., the example user interfaces of FIGS. 2A and 2B) instructing the user 140 how to use the simple user interface presented at the set-top box 105 to configure set-top box 105 for residential gateway 120 communication. The example user interface of FIG. 2B provides the user with two numbers 205 and 210 to be entered by the user 140 at the set-top box 105. The example user interface of FIG. 3A includes two boxes 305 and 310 into which the two numbers 205 and 210 provided to the user by the example user interface of FIG. 2B can be easily entered by the user 140 via the remote control.

Figures 2C, 2D:
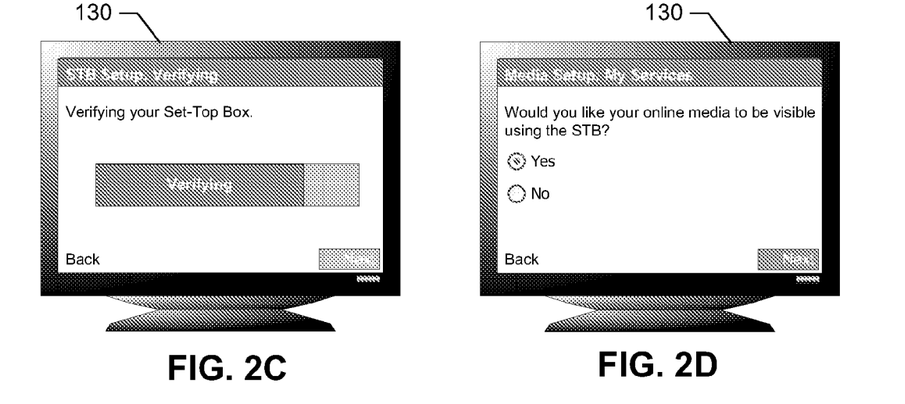

Once the numbers are input by the user 140, the example set-top box 105 of FIG. 1 attempts to establish communication between the set-top box 105 and the residential gateway 120. If successful, the set-top box 105 displays a second simple user interface (e.g., the example user interface of FIG. 3B) indicating that the set-top box 105 is now communicatively coupled to the residential gateway 120. If the set-top box 105 is successful in establishing communication with the residential gateway 120, the example installer 155 of FIG. 1 automatically (e.g., without the requiring the user 140 to do anything) authenticates the set-top box 105 for online services using the username and password provided by the user 140 during configuration of the residential gateway 120 (e.g., see the example user interface of FIG. 2C). If the set-top box 105 is unsuccessful in establishing communication with the residential gateway 120, the example installer 155 of FIG. 1 presents one or more additional user interfaces to assist the user 140 in configuring the set-top box 105.

Figures 2E, 2F:
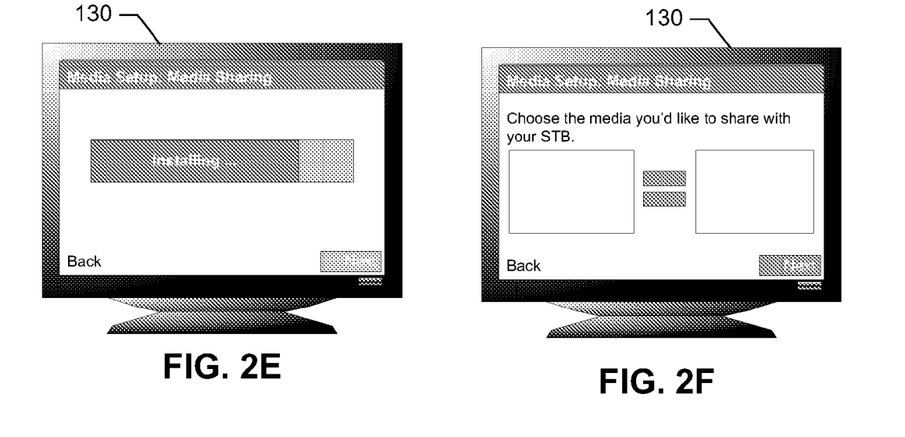

The example installer 155 of FIG. 1 presents a user interface (e.g., the example user interface of FIG. 2D) to ask the user 140 if they would like to share content between the set-top box 105 and the personal computer 130. If the user 140 wants to share content, the example installer 155 automatically installs media sharing software on the personal computer 130 (e.g., see the example user interface of FIG. 2E), and presents another user interface (e.g., the example user interface of FIG. 2F) that allows the user 140 to select media to be shared. When the user 140 is done making media sharing selections using the example user interface of FIG. 2F, the installer 155 automatically shares (e.g., copies) the selected media between the set-top box 105 and the personal computer 130.

Figure 3A:
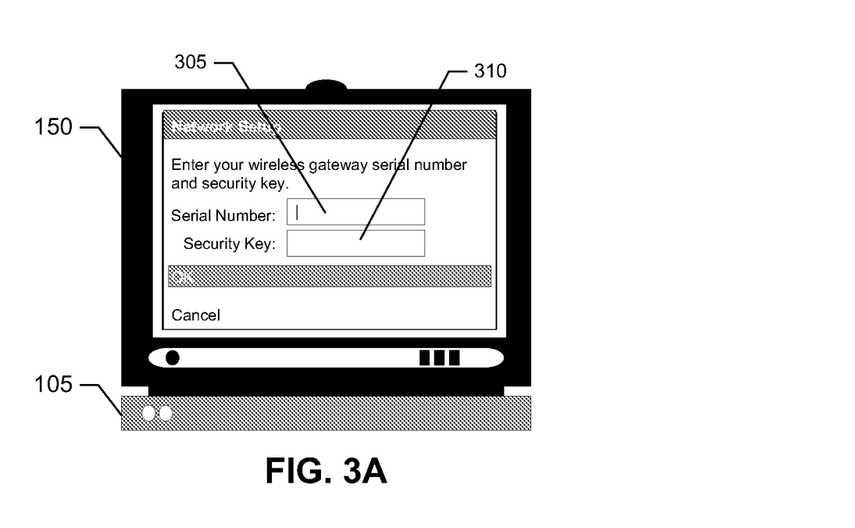
FIGS. 3A-B illustrate example user interfaces that may be used to implement the example set-top box of FIG. 1.

Additionally or alternatively, the pairing of the set-top box 105 and the residential gateway 120 may be further automated to eliminate the need for the user 140 to enter the numbers 205 and 210 into the example user interface of FIG. 3A. For example, the example installer 155 of FIG. 1 could interact with a back-end server 165 of the content provider 110 to determine whether the set-top box 105 should be automatically coupled to the residential gateway 120 and/or automatically authenticated for online services. Such an interaction could be based on a set-top box identifier 170 (e.g., a smart-card identifier) associated with the set-top box 105 and/or a billing phone number previously associated and/or programmed into the set-top box 105.

Figure 4:
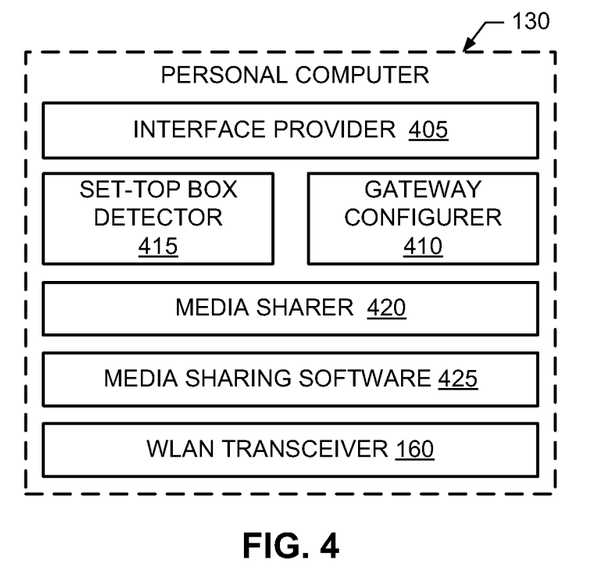
FIG. 4 illustrates an example manner of implementing the example personal computer of FIG. 1.

FIG. 4 illustrates an example manner of implementing the example personal computer 130 of FIG. 1. To communicatively couple the example personal computer 130 of FIG. 4 with a WLAN (e.g., the example WLAN 125 of FIG. 1), the example personal computer 130 includes any type of WLAN transceiver 160. The example WLAN transceiver 160 of FIG. 4 is implemented in accordance with any past, present and/or future WLAN standards and/or specifications, such as the IEEE 802.11x family of standards.

To present graphical user interfaces and to receive user inputs, the example personal computer 130 of FIG. 4 includes an interface provider 405. As directed by a gateway configurer 410, a set-top box detector 415 and/or a media sharer 420, the example interface provider 405 of FIG. 1 presents a user interface (e.g., any of the example user interfaces of FIGS. 2A-F), receives user inputs and/or selections, and provides the user inputs and/or selections to the gateway configurer 410, the set-top box detector 415 and/or the media sharer 420.

To configure a residential gateway (e.g., the example residential gateway 120 of FIG. 1), the example personal computer 130 of FIG. 4 includes the example gateway configurer 410. The gateway configurer 410 of FIG. 4 directs the interface provider 405 to present one or more user interfaces to obtain configuration information of the residential gateway, and uses the obtained configuration information to configure and/or program the residential gateway via the WLAN transceiver 160. Once the example gateway configurer 410 of FIG. 4 completes configuration of the residential gateway, the gateway configurer 410 initializes the set-top box detector 415.

To detect a set-top box (e.g., the example set-top box 105 of FIG. 1), the example personal computer 130 of FIG. 4 includes the example set-top box detector 415. The example set-top box detector 415 of FIG. 4 performs a query of a WLAN (e.g., the example WLAN 120) to detect whether a set-top box is present. If a set-top box is detected, the example set-top box detector 415 directs the set-top box 105 to present a simple user interface (e.g., the example user interface of FIG. 3A), and provides one or more user interfaces (e.g., the example user interfaces of FIGS. 2A and 2B) to let a user 140 know that a set-top box 105 was detected and to provide instructions on how to complete configuration of the set-top box 105. If the set-top box 105 becomes communicatively coupled to the residential gateway, the set-top box detector 415 automatically authenticates the set-top box 105 (e.g., with the user's username and password) for online services and initializes the media sharer 420.

To share media, the example personal computer 130 of FIG. 4 includes the example media sharer 420. The example media sharer 420 directs the interface provider 405 to present an interface (e.g., the example user interface of FIG. 2D) to determine whether the user desires to share media between the personal computer 130 and the set-top box 105. If the user desires to share media, the example media sharer 420 installs media sharing software 425 on the personal computer 130, and directs the interface provider 405 to present an interface (e.g., the example user interface of FIG. 2F) to allow the user to select media to be shared. When the user is done selecting media to be shared, the media sharer 420 directs the installed media sharing software 425 to share (e.g., copy) the shared media.

While an example manner of implementing the example personal computer 130 of FIG. 1 has been illustrated in FIG. 4, one or more of the elements, processes and/or devices illustrated in FIG. 4 may be combined, divided, re-arranged, omitted, eliminated and/or implemented in any other way. Further, the example interface provider 405, the example gateway configurer 410, the example set-top box detector 415, the example media sharer 420, the example media sharing software 425, the example WLAN transceiver 160 and/or, more generally, the example personal computer 130 of FIG. 4 may be implemented by hardware, software, firmware and/or any combination of hardware, software and/or firmware. Thus, for example, any or all of the example interface provider 405, the example gateway configurer 410, the example set-top box detector 415, the example media sharer 420, the example media sharing software 425, the example WLAN transceiver 160 and/or, more generally, the example personal computer 130 may be implemented by one or more circuit(s), programmable processor(s), application specific integrated circuit(s) (ASIC(s)), programmable logic device(s) (PLD(s)) and/or field programmable logic device(s) (FPLD(s)), etc. When any of the appended claims are read to cover a purely software implementation, at least one of the example interface provider 405, the example gateway configurer 410, the example set-top box detector 415, the example media sharer 420, the example media sharing software 425, the example WLAN transceiver 160 and/or, more generally, the example personal computer 130 are hereby expressly defined to include a tangible medium such as a memory, a digital versatile disc (DVD), a compact disc (CD), etc. In a presently preferred example, the example gateway configurer 410, the example set-top box detector 415 and the example media sharer 420 of FIG. 4 are implemented by the example installer 155 of FIG. 1. The installer 155 could be provided to the user 140 on a non-volatile media (e.g., a compact disc) together with the residential gateway 120. The user 140 would insert the non-volatile media into the personal computer 130 to initiate execution of the installer 155 to configure their broadband-enabled entertainment system comprising their set-top box 105. Upon completion of the installer 155, the non-volatile media would be removed from the personal computer 130, and the gateway configurer 410, the set-top box detector 415, and the media sharer 420 would be unloaded from the main memory of the personal computer 130. However, the media sharing software 425, which was installed by the installer 155, would remain stored in the personal computer 130 (e.g., on a hard disk drive) for future use. Further still, the example personal computer 130 may include one or more elements, processes and/or devices in addition to, or instead of, those illustrated in FIG. 4, and/or may include more than one of any or all of the illustrated elements, processes and devices.

Figure 5:
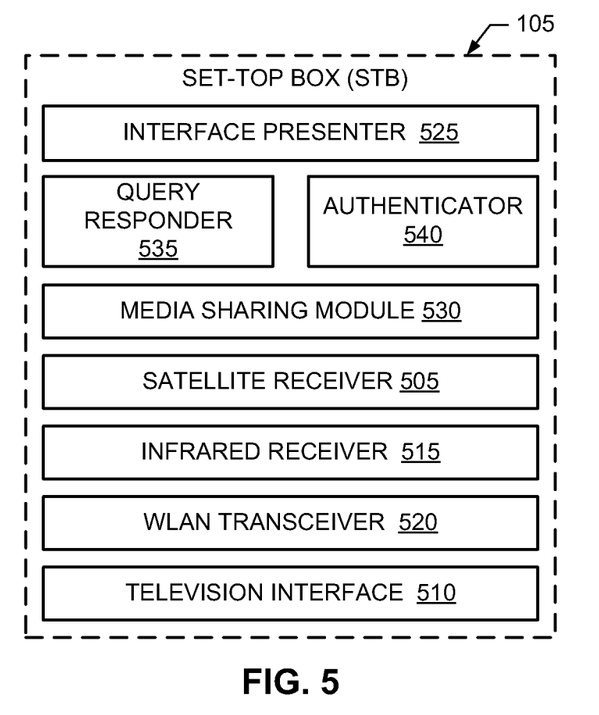
FIG. 5 illustrates an example manner of implementing the example set-top box of FIG. 1.

FIG. 5 illustrates an example manner of implementing the example set-top box 105 of FIG. 1. To receive the example satellite signal 115 (FIG. 1), the example set-top box 105 of FIG. 5 includes any type of satellite receiver 505. To display content and/or user interfaces, the example set-top box 105 of FIG. 1 includes a television interface 510. To receive user inputs and/or selections, the example set-top box 105 of FIG. 1 includes an infrared receiver 515. A user 140 of the set-top box 105 can use a remote control 145 to select a program to view via the infrared receiver 515. The selected program is received, for example, via the satellite receiver 505 and displayed via the television interface 510.

To communicatively couple the example set-top box 105 of FIG. 5 with the example WLAN 125 (FIG. 1), the example set-top box 105 includes any type of WLAN transceiver 520. The example WLAN transceiver 520 of FIG. 5 is implemented in accordance with any past, present and/or future WLAN standards and/or specifications, such as the IEEE 802.11x family of standards.

Figure 3B:
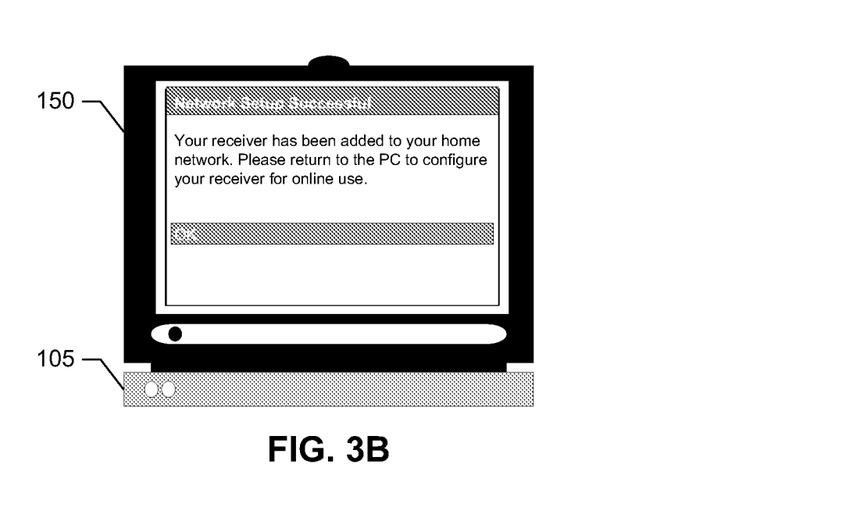

To present graphical user interfaces, the example set-top box 105 of FIG. 5 includes an interface presenter 525. The example interface presenter 525 of FIG. 5 displays and/or presents any number and/or type(s) of interfaces, such as an electronic program guide to assist in the selection of programs and/or the configuration of user interfaces, such as the example user interfaces of FIGS. 3A and/or 3B.

To share media with the example personal computer 130 (FIG. 1), the example set-top box 105 of FIG. 5 includes a media sharing module 530. The example media sharing module 530 of FIG. 5 interacts with one or more communicatively coupled personal computers (e.g., via the example WLAN 125) to present content received at any of the personal computers and/or to share media with any of the personal computers.

To respond to a detection query, the example set-top box 105 of FIG. 5 includes a query responder 535. When queried by a personal computer (e.g., by the example installer 155 of FIG. 1), the example query responder 535 of FIG. 5 replies with a response indicating that the set-top box 105 is present. The example query responder 535 directs the example interface presenter 525 to display a simple user interface that allows a user to provide a security key enabling the set-top box 105 to become communicatively coupled to a residential gateway (e.g., the example residential gateway 120). When the security key is received via the infrared receiver 515, the query responder 535 directs an authenticator 540 to establish communication with the residential gateway 120. The example query responder 535 of FIG. 1 also responds to a query verifying that the set-top box 105 is able to communicate with the residential gateway 120.

To establish communication with a residential gateway (e.g., the example residential gateway 120 of FIG. 1), the example set-top box 105 of FIG. 5 includes the example authenticator 540. The example authenticator 540 of FIG. 5 uses a security key received via the infrared receiver 515 to setup communication with the residential gateway 120. Upon successfully establishing communication with the residential gateway 120, the example authenticator 540 directs the interface presenter 525 to present an interface (e.g., the example user interface of FIG. 3B) indicating that communication with the residential gateway 120 has been established. The example authenticator 540 also receives online services authentication information (e.g., a username and password) from a personal computer (e.g., the example personal computer 130). When the set-top box 105 attempts to access online services via the residential gateway, the example authenticator 540 provides the authentication information so that access can be granted by the online server.

While an example manner of implementing the example set-top box 105 of FIG. 1 has been illustrated in FIG. 5, one or more of the elements, processes and/or devices illustrated in FIG. 5 may be combined, divided, re-arranged, omitted, eliminated and/or implemented in any other way. Further, the example satellite receiver 505, the example television interface 510, the example infrared receiver 515, the example WLAN transceiver 520, the example interface presenter 525, the example media sharing module 530, the example query responder 535, the example authenticator 540 and/or, more generally, the example set-top box 105 of FIG. 5 may be implemented by hardware, software, firmware and/or any combination of hardware, software and/or firmware. Thus, for example, any or all of the example satellite receiver 505, the example television interface 510, the example infrared receiver 515, the example WLAN transceiver 520, the example interface presenter 525, the example media sharing module 530, the example query responder 535, the example authenticator 540 and/or, more generally, the example set-top box 105 may be implemented by one or more circuit(s), programmable processor(s), ASIC(s), PLD(s) and/or FPLD (s), etc. When any of the appended claims are read to cover a purely software implementation, at least one of the example satellite receiver 505, the example television interface 510, the example infrared receiver 515, the example WLAN transceiver 520, the example interface presenter 525, the example media sharing module 530, the example query responder 535, the example authenticator 540 and/or, more generally, the example set-top box 105 are hereby expressly defined to include a tangible medium such as a memory, a DVD, a CD, etc. Further still, the example set-top box 105 may include one or more elements, processes and/or devices in addition to, or instead of, those illustrated in FIG. 5, and/or may include more than one of any or all of the illustrated elements, processes and devices.

Figure 6:
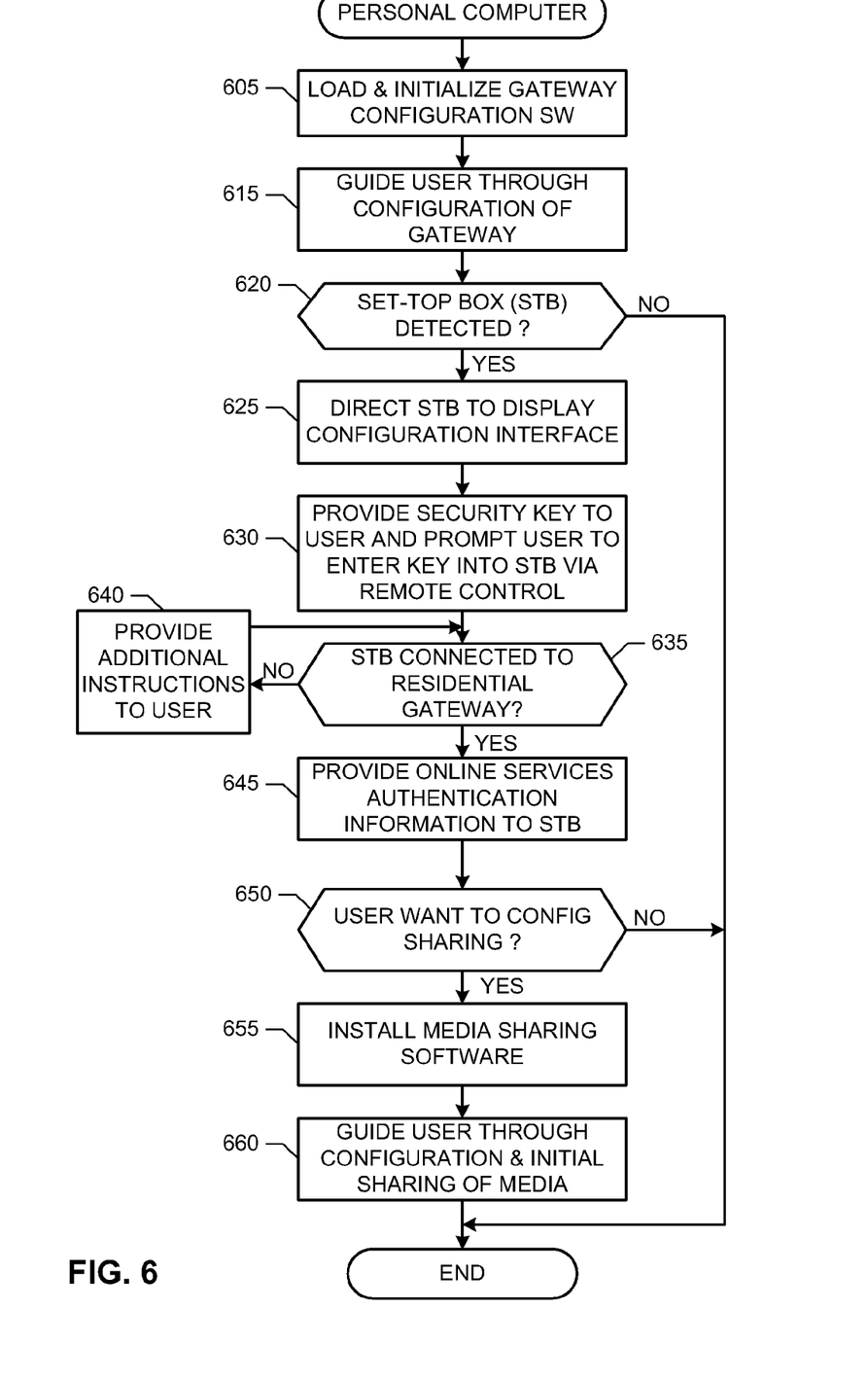
FIG. 6 is a flowchart representative of example machine accessible instructions that may be carried out by, for example, a processor to implement the example installer of FIGS. 1 and/or 4.
Figure 7:
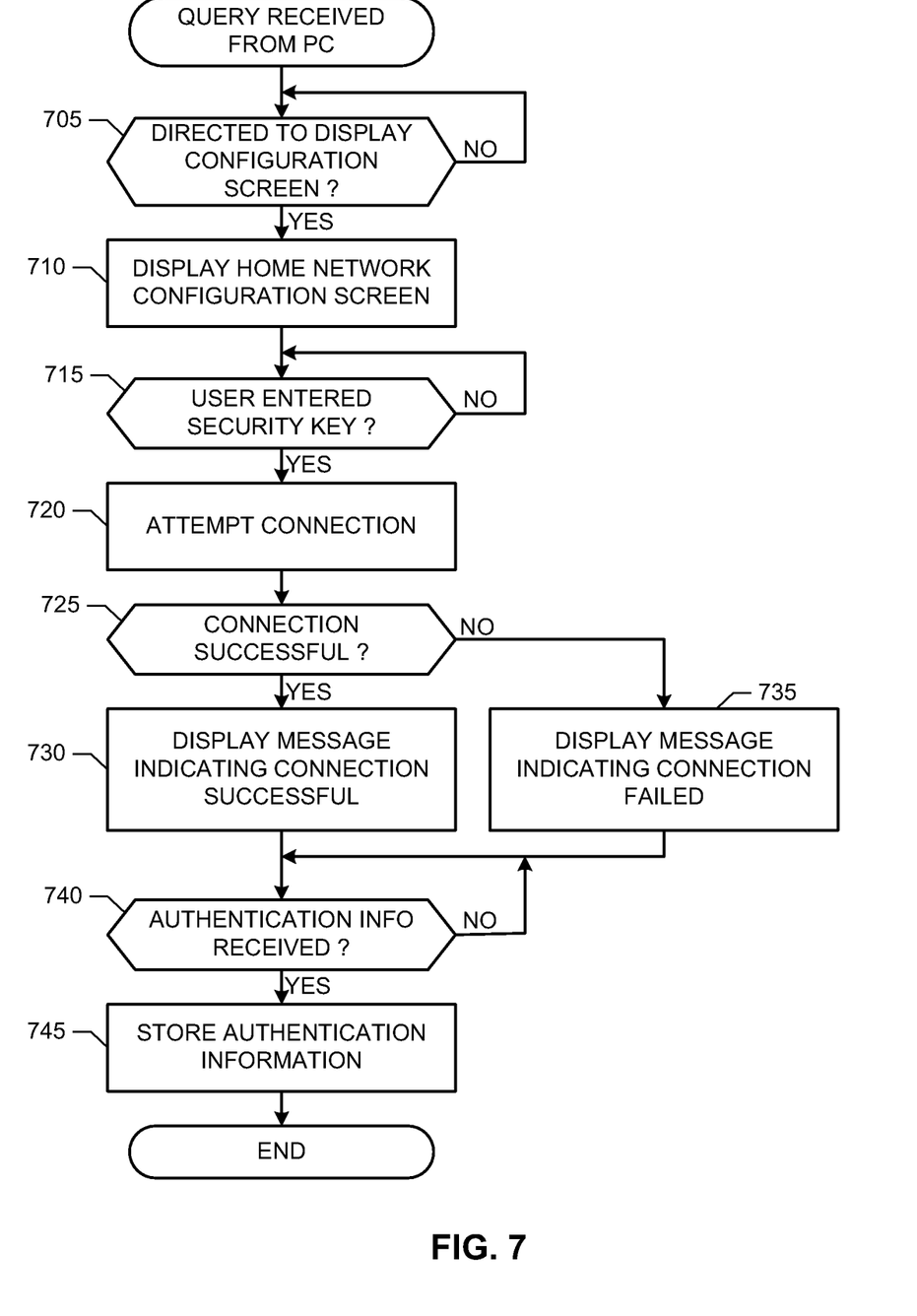
FIG. 7 is a flowchart representative of example machine accessible instructions that may be carried out by, for example, a processor to implement the example set-top box of FIGS. 1 and/or 5.

FIGS. 6 and 7 are flowcharts representative of machine accessible instructions that may be carried out to implement the example installer 155 and the example set-top box 105 of FIG. 1, respectively. The example machine accessible instructions of FIGS. 6 and/or 7 may be carried out by a processor, a controller and/or any other suitable processing device. For example, the example machine accessible instructions of FIGS. 6 and/or 7 may be embodied in coded instructions stored on a tangible medium such as a flash memory, a read-only memory (ROM) and/or random-access memory (RAM) associated with a processor (e.g., the example processor 805 discussed below in connection with FIG. 8). Alternatively, some or all of the example machine accessible instructions of FIGS. 6 and/or 7 may be implemented using any combination(s) of ASIC(s), PLD(s), FPLD(s), discrete logic, hardware, firmware, etc. Also, some or all of the example machine accessible instructions of FIGS. 6 and/or 7 may be implemented manually or as any combination of any of the foregoing techniques, for example, any combination of firmware, software, discrete logic and/or hardware. Further, although the example operations of FIGS. 6 and 7 are described with reference to the flowcharts of FIGS. 6 and 7, many other methods of implementing the operations of FIGS. 6 and 7 may be employed. For example, the order of execution of the blocks may be changed, and/or one or more of the blocks described may be changed, eliminated, sub-divided, or combined. Additionally, any or all of the example machine accessible instructions of FIGS. 6 and/or 7 may be carried out sequentially and/or carried out in parallel by, for example, separate processing threads, processors, devices, discrete logic, circuits, etc.

The example machine accessible instructions of FIG. 6 begin when a user initiates the example installer 155 of FIG. 1 at the example personal computer 130. The installer 155 is loaded into the main memory of the personal computer 130 and initialized (block 605). The example gateway configurer 410 of FIG. 4 guides the user 140 through the process of configuring the residential gateway 120 (block 610). The example set-top box detector 415 queries the example WLAN 125 to detect whether the example set-top box 105 is present (block 620). If the set-top box 105 is not present (block 620), control exits from the example machine accessible instructions of FIG. 6.

If the set-top box 105 is detected (block 620), the set-top box detector 415 directs the set-top box 105 to display the example user interface of FIG. 3A that allows the user 140 to configure the set-top box 105 (block 625), and provides the example user interfaces of FIGS. 4A and 4B to instruct the user 140 how to complete the configuration of the set-top box 105 (block 630).

The set-top box detector checks 415 if the set-top box 105 has successfully established communication with the residential gateway 120 (block 635). If communication has not been successfully established (block 635), the set-top box detector 415 presents additional instructions to assist the user 140 (block 640). Control then returns to block 635 of check if communication has been successfully established.

If communication has been established between the set-top box 105 and the residential gateway 120 (block 635), the set-top box detector 415 provides authentication credentials that the set-top box 105 can use to access online services (block 645).

The example media sharer 420 of FIG. 4 determines whether the user 140 wants to setup media sharing on the personal computer 130 (block 650). If the user 140 does not want to setup media sharing (block 650), control exits from the example machine accessible instructions of FIG. 6.

If the user 140 wants to setup media sharing (block 650), the media sharer 420 installs the example media sharing software 425 on the personal computer 130 (block 655) and guides the user 140 through the configuration and selection of media to be shared (block 660). Control then exits from the example machine accessible instructions of FIG. 6.

The example machine accessible instructions of FIG. 7 begin when the example query responder 535 of FIG. 5 receives a detection query from the example personal computer 130. The query responder 535 waits for the personal computer 130 to instruct it to display the example user interface (configuration screen) of FIG. 3A (block 705). When instructed by the personal computer 130, the query responder 535 displays the configuration screen (block 710). Alternatively, the query responder 535 automatically displays the configuration screen in response to the detection query.

The query responder 535 waits for a user to enter the security key (e.g., via the example infrared receiver 515) (block 715). When the security key has been entered (block 715), the example authenticator 540 attempts to establish communication with the example residential gateway 120 of FIG. 1 (block 720). If communication is successfully established (block 725), the authenticator 540 displays the example user interface of FIG. 3B to indicate that communication was established (block 730). If communication was not successfully established (block 725), the authenticator 540 displays a message indicating that communication was not established (block 735).

The authenticator 540 waits to receive online services authentication information (e.g., a username and a password) (block 740). When online services authentication information is received (block 740), the authenticator 540 stores the authentication information (block 745). Control then exits from the example machine accessible instructions of FIG. 7.

Figure 8:
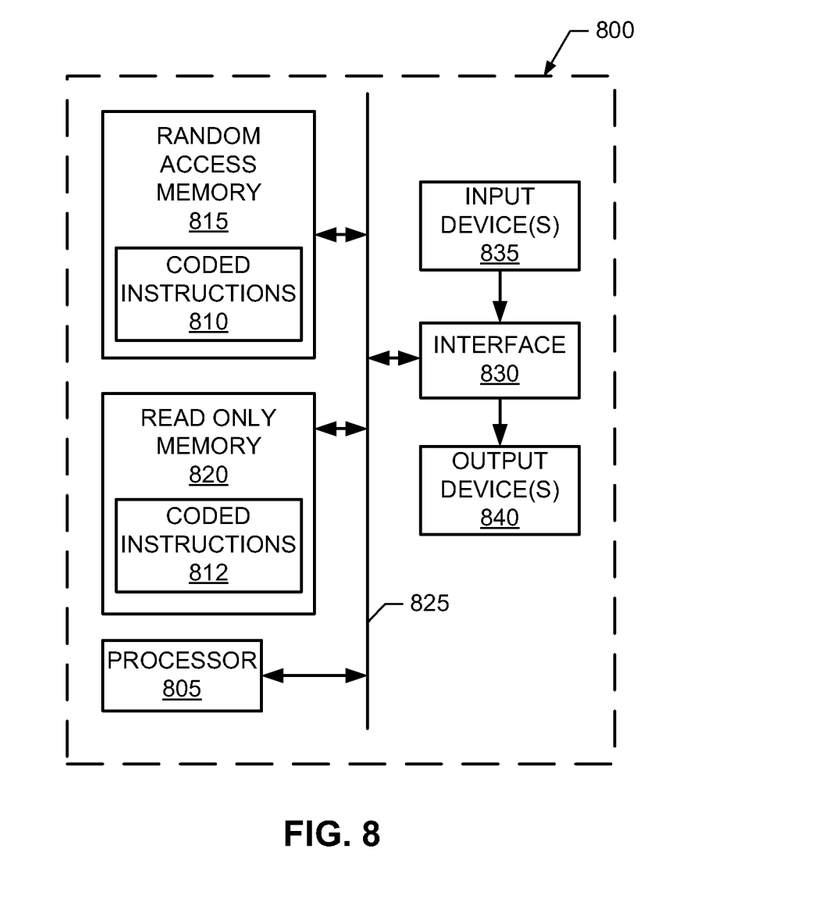
FIG. 8 is a schematic illustration of an example processor platform that may be used and/or programmed to execute the example machine accessible instructions of FIGS. 6 and 7 to implement any or all of the example personal computers and/or the example set-top boxes described herein.

FIG. 8 is a schematic diagram of an example processor platform 800 that may be used and/or programmed to implement any portion(s) and/or all of the example personal computer 130 and/or the example set-top box 105 of FIGS. 1, 4 and/or 5. For example, the processor platform 800 can be implemented by one or more processors, processor cores, microcontrollers, digital signal processors (DSPs), DSP cores, advanced reduced instruction set computer (RISC) machine (ARM) processors, ARM cores, etc.

The processor platform 800 of the example of FIG. 8 includes at least one programmable processor 805. The processor 805 executes coded instructions 810 and/or 812 present in main memory of the processor 805 (e.g., within a RAM 815 and/or a ROM 820). The processor 805 may be any type of processing unit, such as a processor core, a processor and/or a microcontroller. The processor 805 may execute, among other things, the example machine accessible instructions of FIG. 6-7 to implement any or all of the example personal computers or set-top boxes described herein. The processor 805 is in communication with the main memory (including a ROM 820 and/or the RAM 815) via a bus 825. The RAM 815 may be implemented by DRAM, SDRAM, and/or any other type of RAM device, and ROM may be implemented by flash memory and/or any other desired type of memory device. Access to the memories 815 and 820 may be controlled by a memory controller (not shown). The memory 815 and/or 820 may be used to, for example, store online services authentication information.

The processor platform 800 also includes an interface circuit 830. The interface circuit 830 may be implemented by any type of interface standard, such as a USB interface, a Bluetooth interface, an external memory interface, serial port, general purpose input/output, etc. One or more input devices 835 and one or more output devices 840 are connected to the interface circuit 830. The input devices 835 and/or output devices 840 may be used to implement the example interface provider 405, the example WLAN transceiver 160, the example interface presenter 525, the example satellite receiver 505, the example WLAN transceiver 515, the example television interface 510, and/or the example infrared receiver 515 described herein.

The order, size, and proportions of the memory illustrated in the example systems may vary. Additionally, although this patent discloses example systems including, among other components, software or firmware executed on hardware, it will be noted that such systems are merely illustrative and should not be considered as limiting. For example, it is contemplated that any or all of these hardware and software components could be embodied exclusively in hardware, exclusively in software, exclusively in firmware or in some combination of hardware, firmware and/or software. Accordingly, the above described examples are not the only way to implement such systems.

At least some of the above described example methods and/or apparatus are implemented by one or more software and/or firmware programs running on a computer processor. However, dedicated hardware implementations including, but not limited to, an ASIC, programmable logic arrays and other hardware devices can likewise be constructed to implement some or all of the example methods and/or apparatus described herein, either in whole or in part. Furthermore, alternative software implementations including, but not limited to, distributed processing or component/object distributed processing, parallel processing, or virtual machine processing can also be constructed to implement the example methods and/or apparatus described herein.

It should also be noted that the example software and/or firmware implementations described herein are stored on a tangible storage medium, such as: a magnetic medium (e.g., a disk or tape); a magneto-optical or optical medium such as a disk; or a solid state medium such as a memory card or other package that houses one or more read-only (non-volatile) memories, random access memories, and/or other re-writable (volatile) memories. Accordingly, the example software and/or firmware described herein can be stored on a tangible storage medium such as those described above or equivalents and successor media.

To the extent the above specification describes example components and functions with reference to particular devices, standards and/or protocols, it is understood that the teachings of the invention are not limited to such devices, standards and/or protocols. Such systems are periodically superseded by faster or more efficient systems having the same general purpose. Accordingly, replacement devices, standards and/or protocols having the same general functions are equivalents which are intended to be included within the scope of the accompanying claims.

Although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A method comprising:
   presenting a first user interface at a first display device in communication with a computer, the computer in communication with a residential gateway, the first user interface to enable a user to configure a communication service between the residential gateway and a service provider;
   determining whether a set-top box is communicatively coupled to the residential gateway;
   when the set-top box is communicatively coupled to the residential gateway, directing the set-top box to present a second user interface at a second display device in communication with the set-top box, the second display device being different than the first display device, the second user interface to accept a security key to enable communication between the residential gateway and the set-top box;
   presenting the security key to the user at the first display device; and
   instructing the user to utilize the second user interface at the second display device and an input device associated with the set-top box to provide the security key to the set-top box to enable communication between the residential gateway and the set-top box, the residential gateway being different from the computer, the first display device, and the second display device.

2. A method as defined in claim 1, further comprising presenting a third user interface at the first display device to enable the user to configure media sharing between the computer and the set-top box.

3. A method as defined in claim 1, further comprising enabling the user to select media to be shared between the computer and the set-top box.

4. A method as defined in claim 3, further comprising sharing the selected media between the computer and the set-top box.

5. A method as defined in claim 1, further comprising providing online services authentication information to the set-top box.

6. A method as defined in claim 5, wherein the online services authentication information are provided to the set-top box via a back-end server.

7. A method as defined in claim 1, further comprising verifying the communicative coupling of the set-top box to the residential gateway.

8. A method as defined in claim 1, wherein the residential gateway is communicatively coupled to a digital subscriber line modem, and the set-top box comprises at least one of an Internet Protocol television receiver, a cable television receiver or a satellite receiver.

9. An apparatus for communicating with a residential gateway, the apparatus comprising:
   a first display device;
   a gateway configurer to configure a communication service between the residential gateway and an Internet service provider;
   a set-top box detector to detect whether a set-top box is communicatively coupled to the residential gateway, and, when the set-top box is communicatively coupled to the residential gateway, to direct the set-top box to present a first user interface at a second display device in communication with the set-top box to accept a security key to enable communication between the residential gateway and the set-top box, the second display device being different than the first display device; and
   an interface provider to present a second user interface at the first display device to provide the security key to a user and to instruct the user to provide the security key to the set-top box via the first user interface and an input device associated with the set-top box.

10. An apparatus as defined in claim 9, further comprising a media sharer to share media with the set-top box, wherein the interface provider is to present a third user interface at the first display device to enable the user to configure media sharing.

11. An apparatus as defined in claim 9, further comprising a network interface to communicatively couple the apparatus to the set-top box and the residential gateway.

12. An apparatus as defined in claim 9, further comprising a processor, wherein the interface provider, the set-top box detector, the gateway configurer and the media sharer comprise machine accessible instructions stored on a tangible computer-readable medium and executed by the processor.

13. A tangible article of manufacture storing machine readable instructions that, when executed, cause a machine to perform a method comprising:
   presenting a first user interface at a first display device in communication with the machine to enable a user to configure a communication service between a residential gateway and a service provider, the machine in communication with the residential gateway;
   detecting whether a set-top box is communicatively coupled to the residential gateway;

when the set-top box is communicatively coupled to the residential gateway, directing the set-top box to present a second user interface at a second display device in communication with the set-top box, the second user interface to accept a security key to enable communication between the residential gateway and the set-top box, the second display device being different from the first display device; and presenting a third user interface at the first display device to provide the security key to the user and to instruct the user to utilize the second user interface to provide the security key to the set-top box to enable communication between the residential gateway and the set-top box.

14. An article of manufacture as defined in claim 13, wherein the machine accessible instructions, when executed, cause the machine to present a fourth user interface at the first display device to enable the user to configure media sharing between the machine and the set-top box.

15. An article of manufacture as defined in claim 14, wherein the machine accessible instructions, when executed, cause the machine to present a fifth user interface at the first display device to enable the user to select media to be shared between the machine and the set-top box.

16. An article of manufacture as defined in claim 15, wherein the machine accessible instructions, when executed, cause the machine to share the selected media between the machine and the set-top box.

17. An article of manufacture as defined in claim 13, wherein the machine accessible instructions, when executed, cause the machine to provide online services authentication information to the set-top box.

18. An article of manufacture as defined in claim 17, wherein the machine accessible instructions, when executed, cause the machine to provide the online services authentication information to the set-top box via a back-end server.

19. An article of manufacture as defined in claim 13, wherein the machine accessible instructions, when executed, cause the machine to verify a communicative coupling of the set-top box to the residential gateway.

20. A communication system comprising:
a set-top box;
a residential gateway to communicatively couple the set-top box to an Internet protocol based network via a first communication path; and
a personal computer to be communicatively coupled to the residential gateway, the personal computer to:
present a first interface at a first display device of the personal computer to enable a user to configure the residential gateway;
detect whether the set-top box is communicatively coupled to the residential gateway;
when the set-top box is communicatively coupled to the residential gateway, direct the set-top box to present a second user interface at a second display device in communication with the set-top box to accept a security key to enable communication between the residential gateway and the set-top box;
present the security key to the user via the first display device; and
instruct the user to provide the security key to the set-top box via the second user interface.

21. A communication system as defined in claim 20, wherein the first communication path comprises a satellite communication path.

22. A communication system as defined in claim 20, wherein the first communication path comprises a cable television communication path.

* * * * *